(12) United States Patent
Bermejo Alvarez et al.

(10) Patent No.: US 7,647,216 B2
(45) Date of Patent: Jan. 12, 2010

(54) METHODS AND SYSTEMS OF THERMAL SIMULATION FOR FIRE ANALYSIS OF OBJECTS

(75) Inventors: Marta Bermejo Alvarez, Madrid (ES); Victor Perez Bermejo, Madrid (ES); Patricia Pineda Espinosa, Madrid (ES)

(73) Assignee: Airbus Espana, SL.L., Madrid (ES)

( * ) Notice: Subject to any disclaimer, the term of this patent is extended or adjusted under 35 U.S.C. 154(b) by 449 days.

(21) Appl. No.: 11/699,126

(22) Filed: Jan. 29, 2007

(65) Prior Publication Data
US 2008/0126038 A1    May 29, 2008

(30) Foreign Application Priority Data
Nov. 29, 2006    (WO) .................... PCT/ES06/70184

(51) Int. Cl.
*G06F 9/455*    (2006.01)
(52) U.S. Cl. ............................... 703/7; 703/2
(58) Field of Classification Search ............ 703/7, 703/2, 9; 340/945; 73/866.1; 169/37, 54; 239/10; 52/720.1; 431/76; 60/737; 434/226; 244/118.5
See application file for complete search history.

(56) References Cited

U.S. PATENT DOCUMENTS

| | | | |
|---|---|---|---|
| 6,418,806 B1* | 7/2002 | Mullender et al. | 73/866.4 |
| 2004/0167757 A1* | 8/2004 | Struijs | 703/2 |
| 2006/0076430 A1* | 4/2006 | Lee | 239/10 |
| 2007/0119603 A1* | 5/2007 | Haaland et al. | 169/54 |
| 2008/0106437 A1* | 5/2008 | Zhang et al. | 340/945 |

* cited by examiner

*Primary Examiner*—Paul L Rodriguez
*Assistant Examiner*—Kandasamy Thangavelu
(74) *Attorney, Agent, or Firm*—Ladas and Parry LLP (57) ABSTRACT

A method for predicting the structural behavior of an object when a fire is applied to it for a given period of time, comprising the following steps: Preparing a computer-implemented 3D Finite Element Model of said object including its thermal relevant material properties and a computer-implemented 2D Finite Volume Model for simulating a fire inside said object and obtaining predicting information regarding its thermal effects; Obtaining the heat transfer coefficients of the structure using said predicting information regarding the thermal effects inside said object; Applying said heat transfer coefficients and other relevant thermal boundary conditions in said 3D Finite Element Model, simulating the application of a fire to said object and obtaining a thermal mapping of the object during said application of fire. The invention also refers to a system for carrying our said method.

10 Claims, 7 Drawing Sheets

METHODS AND SYSTEMS OF THERMAL SIMULATION FOR FIRE ANALYSIS OF OBJECTS

FIELD OF THE INVENTION

The present invention refers to methods and systems of thermal simulation for fire analysis of objects, in particular aircraft-structures, designed to withstand the effect of a fire.

BACKGROUND OF THE INVENTION

Compliance against the fire effect over the aircraft is one of the items required to obtain aircraft certification.

In the aircraft there are a number of designated fire zones which shall be able to withstand the effect of an applied fire for a period of time given according to the zone category requirements and without having a detrimental effect on the aircraft performances outside a predetermined margin.

The different categories according to the fire resistance are as follows:

- Areas which not require to be able to withstand the effect of a fire.
- Fire resistance areas. Zones affected by this classification shall be able to withstand the effect of a standard flame for 5 minutes.
- Fire proof areas. Zones affected by this classification shall be able to withstand the effect of a standard flame for 15 minutes.

Generally speaking engine and auxiliary power unit compartment are designated fire areas. Those areas are the ones where flammable mixtures can be expected to occur as a result of a fault causing spillage or leakage and where an explosive environment may occur, therefore they shall be demonstrated to as fire proof under different requirements:

- Areas required to withstand the application of a flame and to put up with the loads imposed by the design.
- Areas required to withstand the application of a flame without flame penetration.

Typically, the compliance against those requirements was demonstrated by physical tests.

This procedure is very costly and the present invention is intended to solve this drawback.

SUMMARY OF THE INVENTION

It is an object of the present invention to provide analytical methods and systems allowing the certification of the compliance of an object such as the structure of a specific zone of an aircraft with predetermined requirements regarding the effects of a fire application for a given period of time.

It is another object of the present invention to provide methods and systems to predict the temperature reached on an object such as the structure of an specific zone of an aircraft as a consequence of a fire application for a given period of time and to provide evidences of its structural behaviour.

It is another object of the present invention to provide methods and systems to simulate the effect of an standard flame on an object such as the structure of a specific zone of an aircraft in conjunction with various other relevant boundary conditions in the aircraft design such as elevated zonal temperatures, initial operating temperatures, conservative accounting for ventilation or heat transfer to other structures.

In one aspect, these and other objects are met by providing a method for predicting the structural behaviour of an object when a fire is applied to it for a given period of time, comprising the following steps:

- Preparing a computer-implemented 3D Finite Element Model of said object including its thermal relevant material properties.
- Preparing a computer-implemented 2D Finite Volume Model for simulating a fire inside said object and obtaining predicting information regarding its thermal effects.
- Obtaining the heat transfer coefficients of the object using said predicting information regarding the thermal effects inside said object.
- Applying said heat transfer coefficients and other relevant thermal boundary conditions in said 3D Finite Element Model, simulating the application of a fire to said object and obtaining a thermal mapping of the object during said application of fire.

In another aspect, the above-mentioned objects are met by providing a system for predicting the structural behaviour of an object when a fire is applied to it for a given period of time, comprising:

- A computer-implemented 3D Finite Element Model of said object including its thermal relevant material properties.
- A computer-implemented 2D Finite Volume Model for simulating a fire inside said object and obtaining predicting information regarding its thermal effects.
- A computer-implemented calculation module for obtaining the heat transfer coefficients using said predicting information regarding the thermal effects inside the object.
- A computer-implemented analytical module that, applying said heat transfer coefficients and other relevant thermal boundary conditions, allows simulating the application of a fire to said object and obtaining a thermal mapping of the object during said application of a fire.

This invention refers a computer thermal analysis which is able to reproduce the effect of a fire over, specially, an aircraft part introducing a new procedure to determine the fire effect over different aircraft structural parts.

Fire environment is complex heat transfer scenario. The main difficulty to face this kind of simulations is to reproduce a non-linear problem with a big amount of factors that can have an influence on the final results.

Due to the fact explained before, the fire effects were not normally simulated and the structural behaviour under this condition was studied by test.

One important feature of this invention is that it provides the possibility of simulation of the fire effects on an object in a complex heat transfer scenario involving a non-linear problem with a big amount of factors that can have an influence on the final results. The simulation process is simplified with variables dependence determination and with the estimation of how theses factors impinge on the final result. In addition, each effect is implemented into the analysis by means of the most suitable tool for an accurate simulation.

Another important feature of this invention is the way of joining different calculation methodologies plus different material properties in order to be able to reproduce the real behaviour over an object.

One advantage of this invention is that it provides the capability of managing a large number of design solutions for an aircraft structure by testing analytically their behaviour under fire conditions in a more easier manner than doing physical testing as in the prior art.

Another advantage of this invention is that allows a time reduction and a money saving in the design process of the aircraft structure.

Other characteristics and advantages of the present invention will be clear from the following detailed description of embodiments illustrative of its object in relation to the attached figures.

DETAILED DESCRIPTION OF THE INVENTION

An embodiment of a method according to this invention for performing the fire analysis of the Auxiliary Power Unit compartment of an aircraft, comprising the following phases: Preparation of Models, Calculation and Simulation and Analysis, will now be described.

I. Preparation of Models a) The preparation of the Finite Element Model (FEM) comprises the following steps.

a1) Importing the structural geometry for the aircraft area to be analysed.

The process uses directly the CATIA or IRIS models normally used during the aircraft design. The geometry is directly imported in a computer system having the NASTRAN-PASTRAN software package (a standard tool for finite element modelling) and it will be ready to be used for the fire simulation analysis.

The flame shall be part of the model. Flame size, temperature and distance to the structure are defined on the applicable regulation (i.e. ISO 2685 "Aircraft Environmental Test Procedure for Airborne Equipment Resistance to Fire in Designated Fire Zones", FAA AC 20-135 "Power-Plant Installation and Propulsion System components Fire protection Test Methods, Standards and Criteria")

a2) Producing the thermal meshing of the structural geometry.

Figure 1:
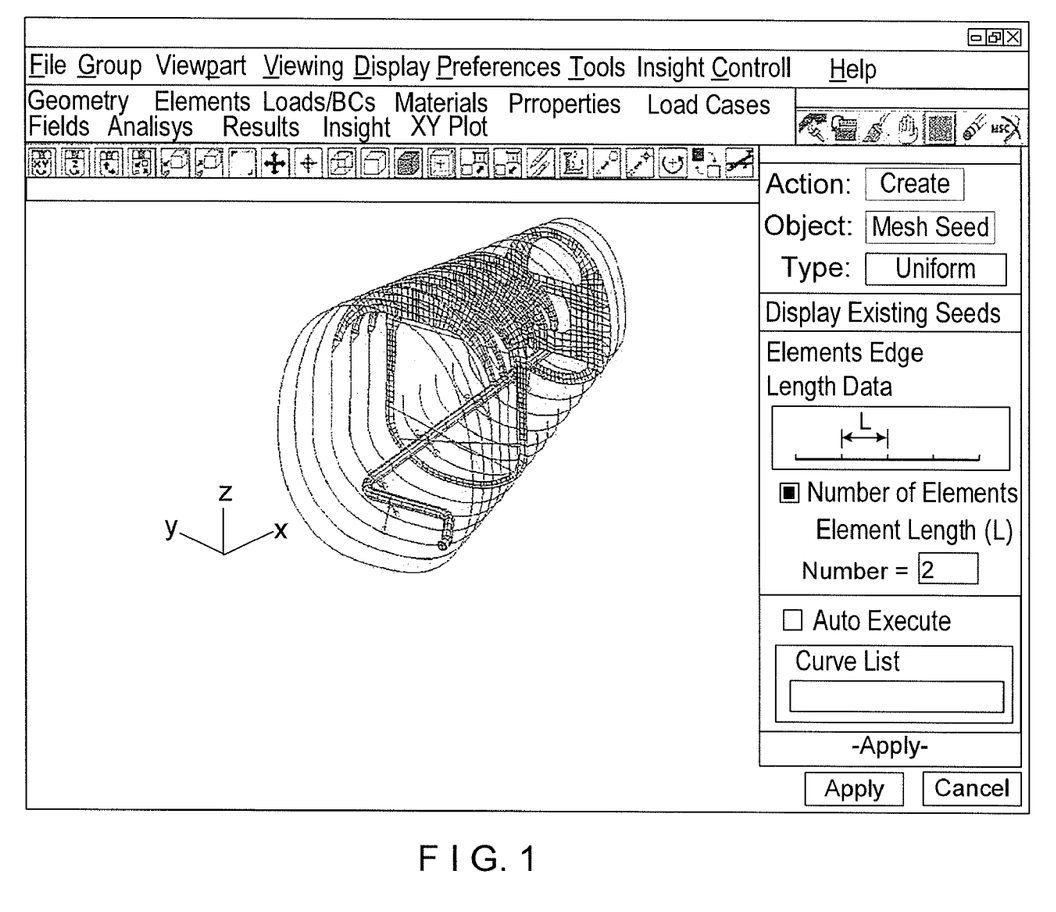
FIG. 1 shows a FEM meshing of an object analyzed according to the present invention.

Once the geometry is imported the thermal meshing will be produced (see FIG. 1). This meshing will include:

- 2D elements, this way of modelling can be used on structural elements that do not have a thermal properties variation on its different axes.
- 3D elements, to be used on all structural parts. However, it is mandatory for the elements that have different thermal properties on its axes. The Carbon Fibre Reinforced Plastic (CFRP), usual in aeronautic structures, is modelled taking into account their real thickness, to consider the 3D orthotropic behaviour of the carbon fibre laminates.

a3) Introducing material properties for each structural item.

The analysis requires the following material properties to be introduced:

Material density ($\rho$).

Material conductivity (k). In some material this property has a dependency on the element orientation axes.

Material Specific Heat (Cp).

The aforementioned properties can be introduced as a constant value or a either time or temperature dependant variable.

Figure 2:
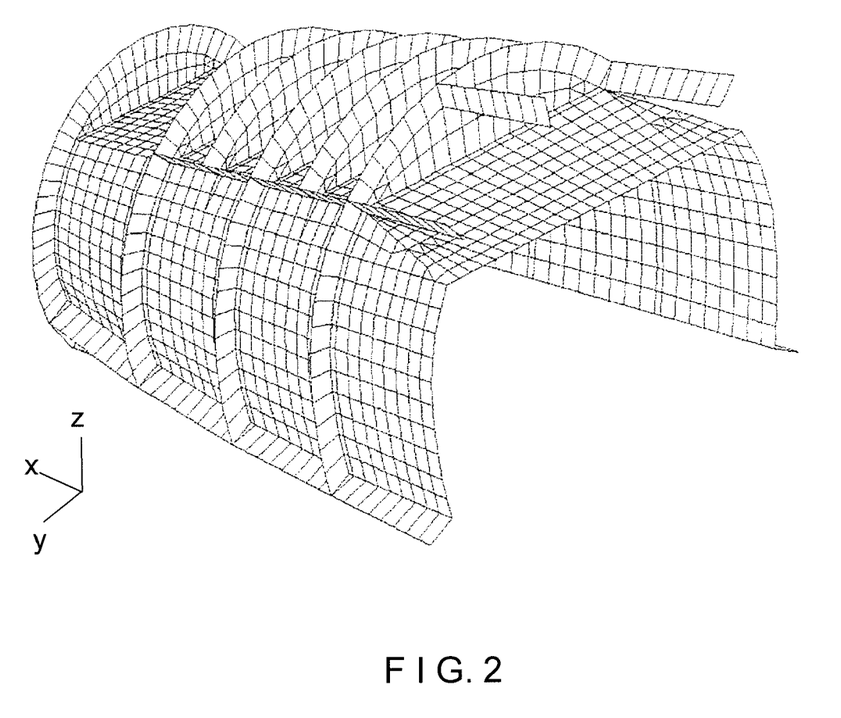
FIG. 2 shows a FEM thermal model of an object analyzed according to the present invention, meshed and ready to apply boundary conditions.

FIG. 2 illustrates the final FEM Thermal Model b) The preparation of the 2D Finite Volume Models (FVM) is done in a computer system having the FLUENT software package (a computational fluid dynamics software package to simulate fluid flow problems).

II. Calculation

Figure 3:
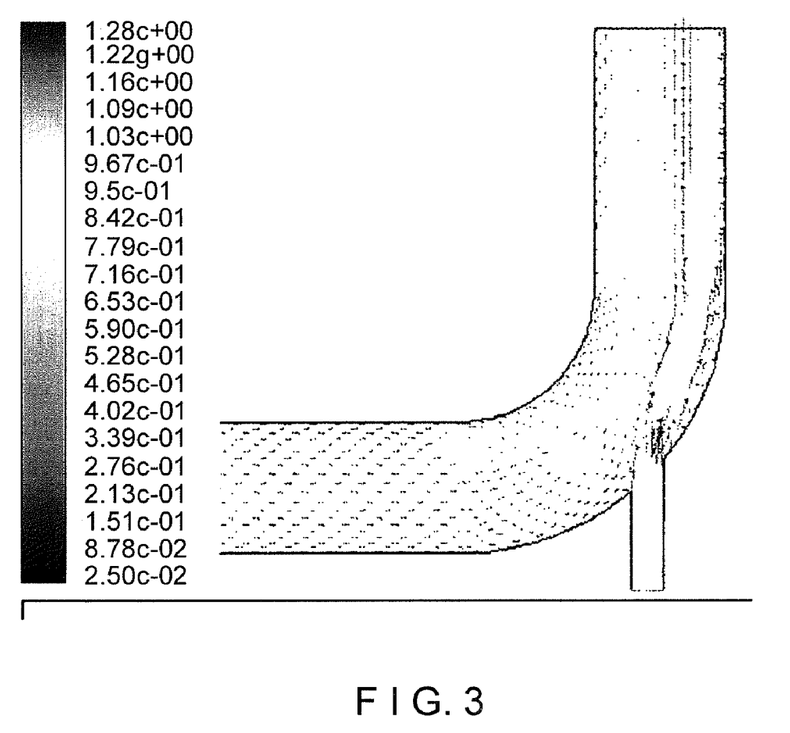
FIG. 3 shows an air flow velocity drawing inside the object analyzed according to the present invention.
Figure 4:
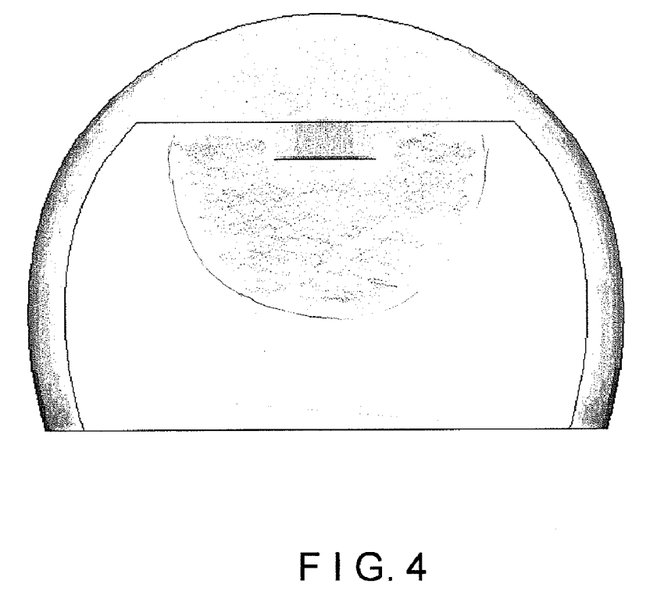
FIG. 4 shows a temperature plot and flame trace inside the object analyzed according to the present invention.

A preliminary simulation analysis using said FVM and computed in CFD-Fluent is done to determine the possible evolution and movement of the flame and the ambient air heated by it (see FIGS. 3 and 4).

This preliminary study takes into account the requirements of ISO 2685 and AC 20-135 for the flame modelling.

The information obtained based on the results of this preliminary analysis is the following:

The identification of different ambient zones inside the model.

The identification of different ambient zones inside the cavities formed between the structural parts of the model.

The prediction of the air movement (if it exists).

The prediction of the feasible trace of the flame on the structural parts.

The next step is to calculate the parameters for the heat transfer coefficients for each of the elements involved.

Figure 5:
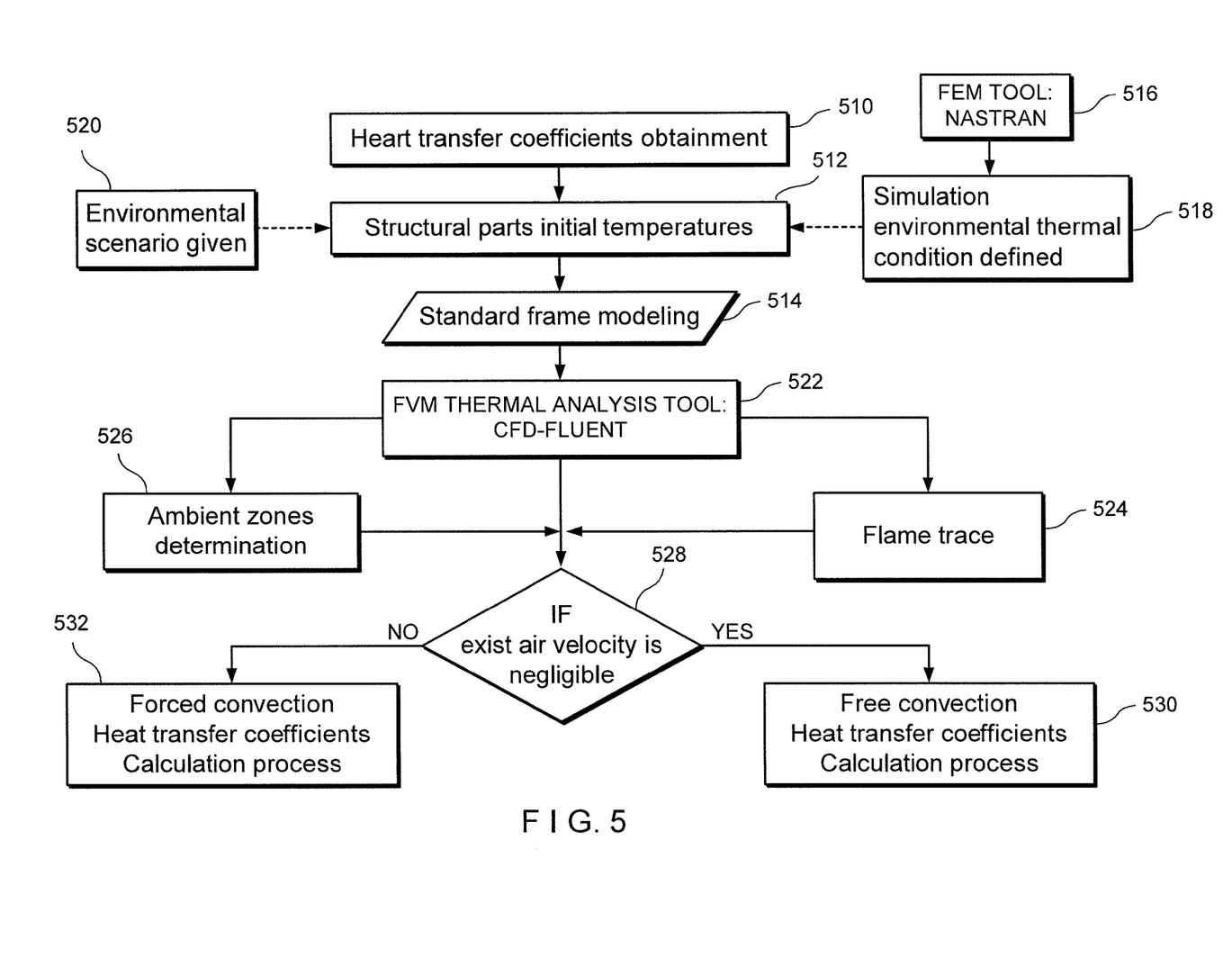
FIGS. 5 and 6 show flow charts illustrating the calculation of the heat transfer coefficients according to the present invention.
Figure 6:
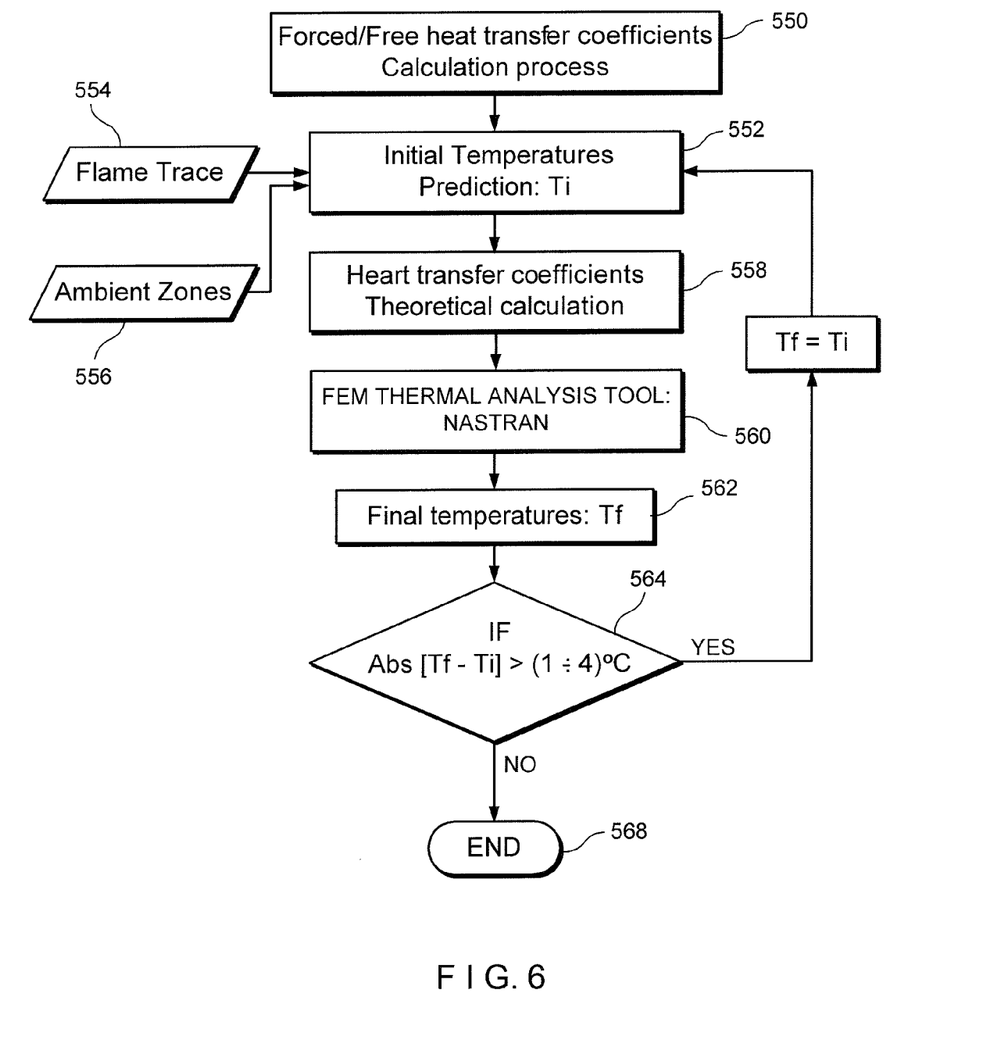

The heat convection coefficients are dependant on the surface temperature, surrounding ambient temperature and fluid velocity around the structural item. The calculation (considering only the effect of conduction and convection) is done in an iterative process illustrated in FIGS. 5 and 6.

Figure 7:
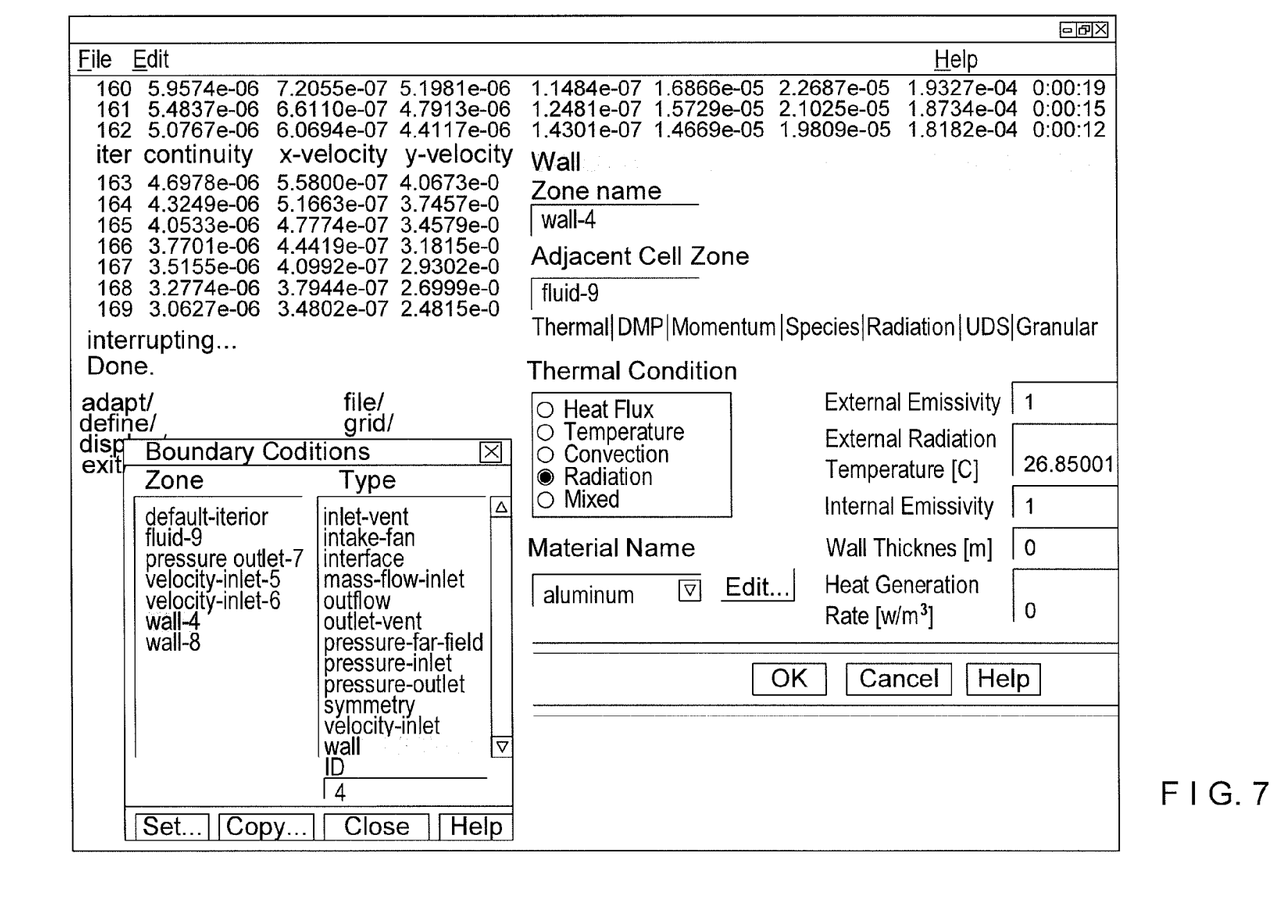
FIG. 7 shows an interface of a computer tool for setting thermal boundary conditions to the object analyzed according to the present invention.

Firstly (see FIG. 5) a FLUENT simulation is carried out with first predicted coefficients based on predicted temperatures for the structural items, for the ambient temperature and assuming a natural convection or forced convection due to the presence of a given velocity around the structure. This first (if any) velocity is provided by a FLUENT computation. Once these coefficients are been introduced (see FIG. 7), a thermal analysis is conducted.

Figure 8:
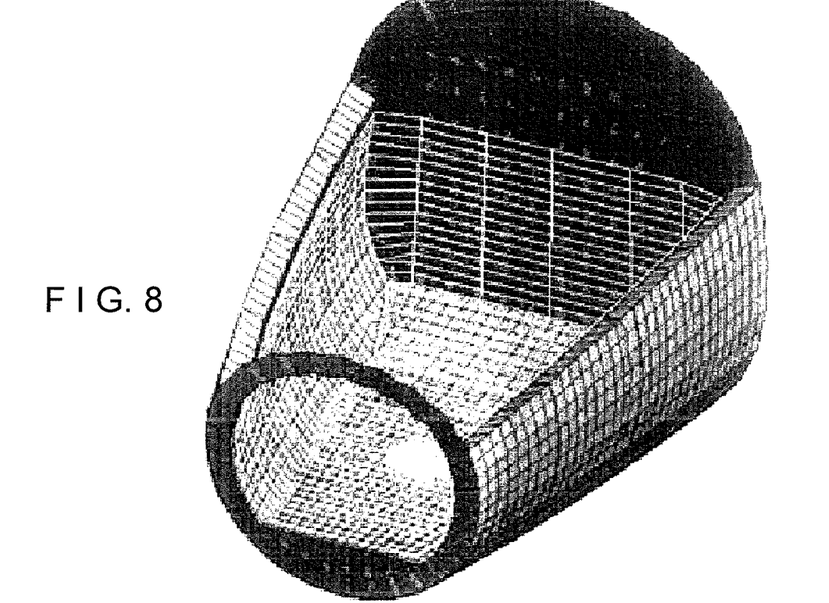
FIG. 8 shows a flame trace simulation by ambient zones in the object analyzed according to the present invention.

Secondly (see FIG. 6) an iterative process using the NASTRAN-PATRAN tool is carried out. Its main steps are the following:

Establishment of initial predicted temperatures Ti for the structures according to the results of the above-mentioned preliminary simulation analysis: Flame Trace, Ambient Zones (see FIG. 8).

Calculation of the heat transfer coefficients based on these initial structural temperatures Ti, ambient temperature and geometry, using theoretical formulas.

Obtainment of the final temperatures Tf.

If initial temperatures Ti and final temperatures Tf do not differ more than ±10% the iterative process for the heat transfer coefficients calculation will end.

The output of this step are the heat transfer coefficients for the complete model. Those coefficients can be constant along the simulation time or time dependant.

Radiation. The radiation effect will be introduced between the structural items and between the flame and structure.

The rate of heat exchange due to radiation effects obeys to the following formula:

$$q = \sigma \cdot (T_1^4 - T_2^4) \cdot A_1 \cdot F_{A_1 - A_2}.$$

σ: Stefan-Boltzman constant.

$F_{A_1-A_2}$: view factor coefficient between the radiation surfaces.

A: radiation surface area.

T1, T2: absolute temperature of radiation surfaces 1 and 2 respectively.

View factors shall be calculated and are a function of:

Heat source (standard flame) relative position.

Specimen geometry and dimensions.

III. Simulation and Analysis

The next step is the application of the thermal boundary conditions and thermal effects as follows.

Conductivity. No special work apart of the thermal meshing and material properties is needed to be able to simulate the conductivity heat transfer between the different structural elements. The thermal conduction process only requires that the elements involved will be in contact in the model meshing produced.

Thermal ambient characteristics. The model performs an ambient temperature prediction for the structure surroundings and other thermal effects as radiation, solar flux . . . which have any impact on the structure temperature.

Thermal flame effect. The effect of the flame is simulated applying:

Convection between the heat source and ambient air bordering the zone affected by the flame.

Radiation between the heat source and the internal zones that shall be affected by the flame.

Convection. The convection between the structural parts and between the flame and the structure surroundings is simulated, using the above-mentioned ambient zones.

Radiation. Factors view and ambient zones are implemented in the radiation between structures parts and between the flame and the structures surroundings.

Before conducting the final thermal analysis it shall be validated that the flame meets the applicable regulation requirements.

Those requirements are focused on 2 main aspects:

Flame temperature. The regulation imposes that the flame temperature shall be 1100±80° C. On the models this is met by maintaining the simulated flame at a constant temperature.

Heat flux density to the structure for a given conditions shall be 116±10 kW/m2. To validate this assumption the heat transfer to the structure is simulated with an initial temperature of 20° C. and with the thermal coefficients calculated for this scenario.

Once the previous steps have been concluded, the analysis is carried out taking into account, among others, the following considerations:

Thermal convection coefficients to be used are those determined on previous steps.

The model includes the maximum temperature that could be withstood by different material. If this maximum temperature is reached the element shall be eliminated from the model.

Special care shall be taken with the composite material, as this element is normally made by different layers of material. Those layers are progressively eliminated from the model when the temperature is increasing according to the material data obtained prior the analysis.

Figure 9:
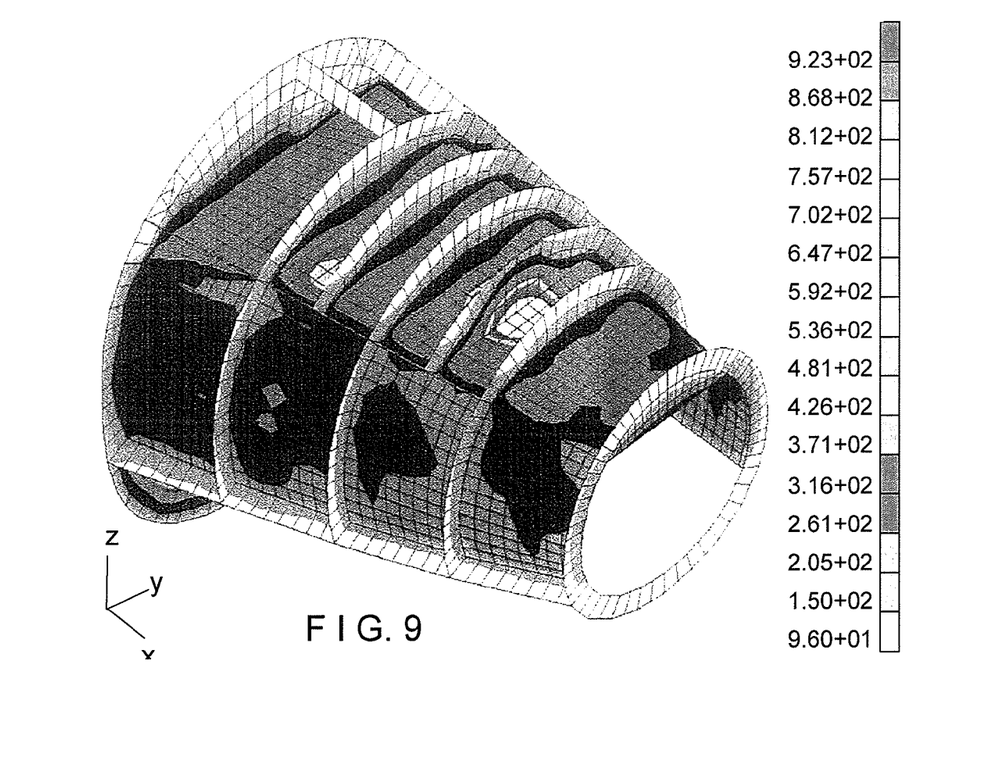
FIG. 9 shows a temperature mapping of the structure tested according to the present invention

The final output of the simulation it is a thermal mapping of the structure along the time (see FIG. 9).

Modifications may be introduced into the preferred embodiment just set forth, which are comprised within the scope defined by the following claims.

The invention claimed is:

1. A method for predicting the structural behavior of an object when a fire is applied to the object for a period of time, the method comprising;
    a) preparing a computer-implemented 3D Finite Element Model of said object including relevant material an thermal properties;
    b) preparing a computer-implemented 2D Finite Volume Model for simulating a fire inside said object and obtaining predicting information regarding thermal effects of the fire;
    c) obtaining the heat transfer coefficients of the structure using said predicting information regarding the thermal effects inside said object;
    d) applying said heat transfer coefficients and other relevant thermal boundary conditions in said 3D Finite Element Model, simulating the application of a fire to said object and obtaining a thermal mapping of the object during said application of fire.

2. A method according to claim 1, characterized in that said predicted information regarding thermal effects inside the object includes information regarding the flame trace, the different ambient zones and the temperatures.

3. A method according to claim 2, characterized in that obtaining the heat transfer coefficients is carried out in two steps: a first step obtaining first predicted heat transfer coefficients using said computer-implemented 2D Finite Volume Model and a second step obtaining final predicted heat transfer coefficients using said 3D Finite Element Model.

4. A method according to claim 1, characterized in that the object is an aircraft structure.

5. A method according to claim 4, characterized in that the object is an auxiliary power unit compartment.

6. A system for predicting the structural behavior of an object when a fire is applied to the object for a given period of time, the system comprising:
    a) a computer-implemented 3D Finite Element Model of said object including relevant material and thermal properties;
    b) a computer-implemented 2D Finite Volume Model for simulating a fire inside said object and obtaining predicting information regarding thermal effects of the fire;
    c) a computer-implemented calculation module for obtaining the heat transfer coefficients using said predicting information regarding the thermal effects inside the object;
    d) a computer-implemented analytical module that, applying said heat transfer coefficients and other relevant thermal boundary conditions, allows simulating the application of a fire to said object and obtaining a thermal mapping of the object during said application of a fire.

7. A system according to claim 6, characterized in that said predicted information regarding thermal effects inside the object includes information regarding the flame trace, the different ambient zones and the temperatures.

8. A system according to claim 7, characterised in that said computer-implemented calculation module for obtaining the heat transfer coefficients comprises a first module for obtaining first predicted heat transfer coefficients using said computer-implemented 2D Finite Volume Model and a second module for obtaining final predicted heat transfer coefficients using said 3D Finite Element Model.

9. A system according to claim 6, characterized in that the object is an aircraft structure.

10. A system according to claim 9, characterized in that the object is an auxiliary power unit compartment.

* * * * *